United States Patent [19]

Sheen et al.

[11] Patent Number: 4,598,593
[45] Date of Patent: Jul. 8, 1986

[54] ACOUSTIC CROSS-CORRELATION FLOWMETER FOR SOLID-GAS FLOW

[75] Inventors: Shuh-Haw Sheen, Naperville; Apostolos C. Raptis, Downers Grove, both of Ill.

[73] Assignee: The United States of America as represented by the United States Department of Energy, Washington, D.C.

[21] Appl. No.: 609,685

[22] Filed: May 14, 1984

[51] Int. Cl.$^4$ .......................... G01F 1/66; G01F 1/70
[52] U.S. Cl. .............................. 73/861.04; 73/861.06
[58] Field of Search ........... 73/861.04, 861.05, 861.06, 73/861.27, 861.28

[56] References Cited

U.S. PATENT DOCUMENTS

| | | | |
|---|---|---|---|
| Re. 28,686 | 1/1976 | Coulthard | 73/861.06 |
| 3,357,243 | 12/1967 | Woodcock | 73/861.27 |
| 4,003,252 | 1/1977 | Dewarth | 73/861.27 |
| 4,004,461 | 1/1977 | Lynnworth | 73/861.27 |
| 4,104,915 | 8/1978 | Husse | 73/861.28 |
| 4,425,804 | 1/1984 | Mount | 73/861.28 |

OTHER PUBLICATIONS

Raptis et al., "Ultrasonic Properties of Coal Slurries and Flow Measurements by CROS Correlation", IEEE Trans. on Sonics & Ultrasonics, vol. Su28, No. 4, pp. 248-256, 7/81.

Flemons, "A New Non-Intrusive Flowmeter", in N.B.S. Special Publication 484, 10/77, pp. 319-333.

Primary Examiner—Herbert Goldstein
Attorney, Agent, or Firm—Jeannette M. Walder; James W. Weinberger; Judson R. Hightower

[57] ABSTRACT

Apparatus for measuring particle velocity in a solid-gas flow within a pipe includes: first and second transmitting transducers for transmitting first and second ultrasonic signals into the pipe at first and second locations, respectively, along the pipe; an acoustic decoupler, positioned between said first and second transmitting transducers, for acoustically isolating said first and second signals from one another; first and second detecting transducers for detecting said first and second signals and for generating first and second detected signals in response to said first and second detected signals; and means for cross-correlating said first and second output signals.

11 Claims, 3 Drawing Figures

ACOUSTIC CROSS-CORRELATION FLOWMETER FOR SOLID-GAS FLOW

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates generally to a method and apparatus for measuring particle velocity in a solid-gas flow.

Pneumatic transport of coal particles is typically used in coal conversion and combustion processes. Measurement of particle velocity in such a transporting line has significant impact on the safe and efficient operation of a coal plant. Unfortunately, on-line continuous particle-velocity monitoring is still a difficult task. Available techniques have limited industrial application. Commonly employed techniques include the radioactive tracer method, optical techniques, electromagnetic methods, and conventional mechanical approaches. Most of these techniques are either unacceptable or impractical to the coal industry, which normally transports coal at high solid loading rates or recycles char particles under high temperature and pressure. The ideal technique must therefore be able to survive the hostile environment, and be nonintrusive and responsive to a wide range of solid loading rates.

Ultrasonic flowmeters can be designed under several principles and methods. One method is to use the cross-correlation technique, which measures the time-of-flight of a certain inherent flow tag passing through two sensors separated by a known distance. The technique has been demonstrated successfully in monitoring single-phase fluid flows in which turbulent eddies modulate the interrogating ultrasonic beams. This type of correlation flowmeter also has been developed for solid-liquid and gas-liquid mixed-phase flows, in which the density fluctation, caused by solid clusters and gas bubbles, is the prime inherent flow tag.

For solid-gas flows, flowmetering by acoustic methods is extremely difficult because of high acoustic attenuation in gases, high particle impingement noise, and problems associated with impedance mismatch. To date, only qualitative particle velocity indication can be made from the measurement of RMS voltages of the acoustic noise generated in the pipe. Even for this technique, the application is limited to low solid loadings because the sensitivity and linear relationship between noise level and particle velocity diminish with increasing solid loading. Cross-correlation techniques have not been suggested for solid-gas flows because of the difficulty in transmitting an acoustic beam through the medium.

Therefore, it is an object of the present invention to provide a method and apparatus for measuring particle velocity in a solid-gas flow under a wide range of particle concentrations.

It is another object of the present invention to adapt the cross-correlation technique to measure particle velocity in a solid-gas flow.

Additional objects, advantages, and novel features of the invention will be set forth in part in the description which follows, and in part will become apparent to those skilled in the art upon examination of the following or may be learned by practice of the invention.

SUMMARY OF THE INVENTION

In solid-gas flow within a pipe particles striking the pipe produce an acoustic noise signal. In the (active) cross-correlation technique, an acoustic signal is applied to the pipe wall at two different locations along the pipe. The applied signal in the pipe wall is modulated by the noise signal produced by particle impingement. It has been found that the magnitude of the noise from particle impingement is linearly proportional to particle velocity, rather than mass flow. Thus, cross-correlation of the noise signal from particle impingement can be used to measure the transit time of particles travelling the distance between two sensors. Although the detection of a noise signal is easily accomplished, it is extremely difficult to get a usable signal for cross-correlation (not all of the noise signal is from particle impingement). This problem is overcome by inserting an acoustic decoupler between the sensors generating the acoustic signal applied to the pipe wall. The acoustic decoupler isolates the applied fields from one another, eliminating cross-talk between the applied fields, and permits detection of a correlatable signal generated from particle impingement.

In accordance with the principles of the present invention, there is provided apparatus for measuring particle velocity in a solid-gas flow within a pipe comprising: first and second transmitting transducers for transmitting first and second ultrasonic signals into the pipe at first and second locations, respectively, along the pipe; an acoustic decoupler, positioned between said first and second transmitting transducers, for acoustically isolating said first and second signals from one another; first and second detecting transducers for detecting said first and second signals and for generating first and second output signals in response to said first and second detected signals; and means for cross-correlating said first and second output signals. A method of measuring particle velocity in a solid-gas flow within a pipe comprises the steps of: transmitting first and second ultrasonic signals into the pipe at first and second locations, respectively, along the pipe; acoustically isolating said first and second signals from one another; detecting said first and second transmitted signals; generating first and second output signals in response to said first and second detected signals; and cross-correlating said first and second output signals.

BRIEF DESCRIPTION OF THE DRAWINGS

The present invention is illustrated in the accompanying drawings wherein.

DETAILED DESCRIPTION OF THE INVENTION

Figure 1:
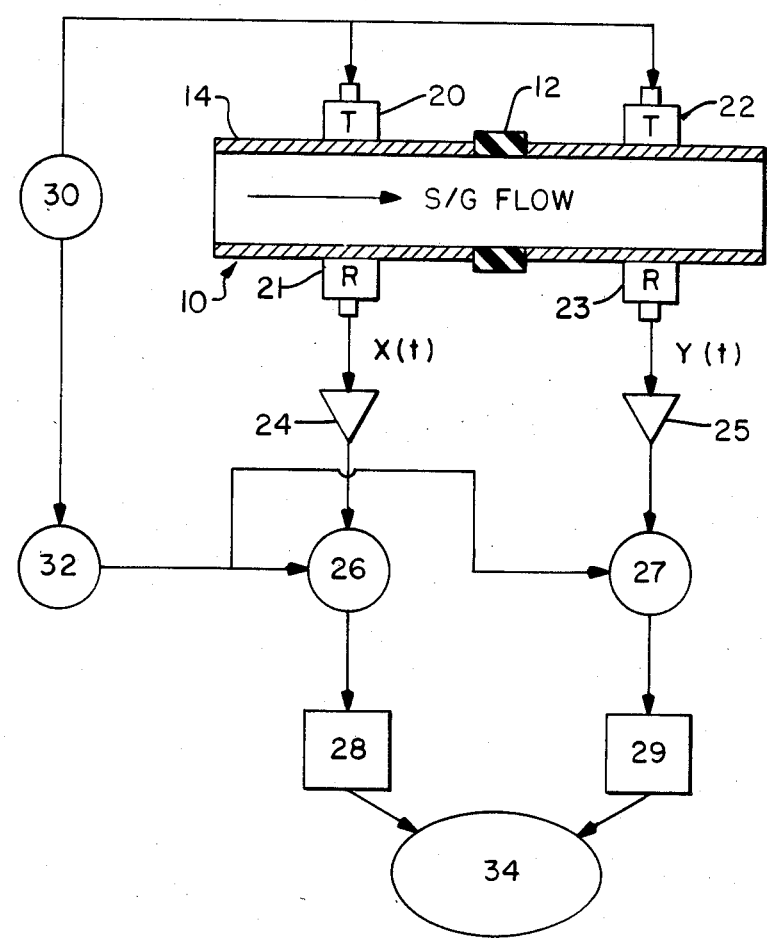
FIG. 1 is a block diagram of an acoustic cross-correlation flowmeter for solid-gas flow.

The embodiment shown in FIG. 1 is in the form of a test section (10) for insertion into the flow line. Test section 10 consists of two pipe sections 14 separated by acoustic decoupler 12. (Clearly, pipe sections 14 could be part of an existing flow line.) Mounted on each pipe section 14 are a transmitting transducer 20 (22) and a receiving transducer 21 (23). Oscillator 30 provides an electrical input signal to transmitting transducers 20 and 22 which generate ultrasonic signals directed into the pipe sections. Acoustic decoupler acoustically isolates the ultrasonic signals generated by transducers 20 and 22. Receiving transducers 21 and 23 detect the transmitted ultrasonic signal as modulated by noise from particle impingement near the pipe wall and generate electrical output signals X(t) and Y(t), respectively. The output signals, X(t) and Y(t) are amplified by narrow band amplifiers 24 and 25 respectively. The amplifier outputs are then input into balanced mixers 26 and 27. In the balanced mixers, the amplified output signals are mixed with the input signal from oscillator 30 which has been phase shifted by phase shifter 30. The balanced mixer takes the two signals, finds the difference in frequency of the signals and puts out a signal proportional to the difference. The output of the mixers are then filtered in filters 28 and 29 (which cuts down low-frequency components due mainly to flow-induced vibration) before being input to cross-correlator 34 for cross-correlation.

Acoustic decoupler 12 may be a segment of pipe formed of any sound insulating material, such as a simple rubber hose or other commonly used gasket material such as viton connecting the two pipe sections (14), with the thickness of the gasket providing a gap between the pipe sections. The gap eliminates acoustic cross-talk between the signals. The transmitting and receiving transducers used may be wide-band longitudinal wave transducers (such as AE FAC500). Since very little acoustic energy is needed to penetrate into the fluid medium, the operating frequency can be in the MHZ range. The cross-correlator may be a real time analyzer (such as Spectrum Dynamic Model SD360).

In developing the test section of FIG. 1, two schemes for acoustically isolating the transmitted signals were compared. Case 1 uses a single acoustic decoupler inserted between two pipe sections (the arrangement of FIG. 1). Case 2 uses two additional acoustic decouplers positioned outside the test section to isolate the test section from the flow line. The test section of FIG. 1 could be easily modified by placing on acoustic decoupler (12) at each end of the test section. In this arrangement, each pipe section 14 would be separated by two decouplers. Note also that each transducer pair (20, 21 and 22, 23) would be separated by two decouplers.

Both arrangements (case 1—one decoupler, case 2—three decouplers) were tested on a facility that circulates limestone in air at 3 lb/s in air flow up to 250 CFM. During the test for Case 1, the air nozzle at the solid-air mixing tee had a gap of 0.28-in., which later was reduced down to 0.2-in. for the second test (case 2). The change in the nozzle gap affected the particle velocity. Thus, two series of data are presented.

Figure 2:
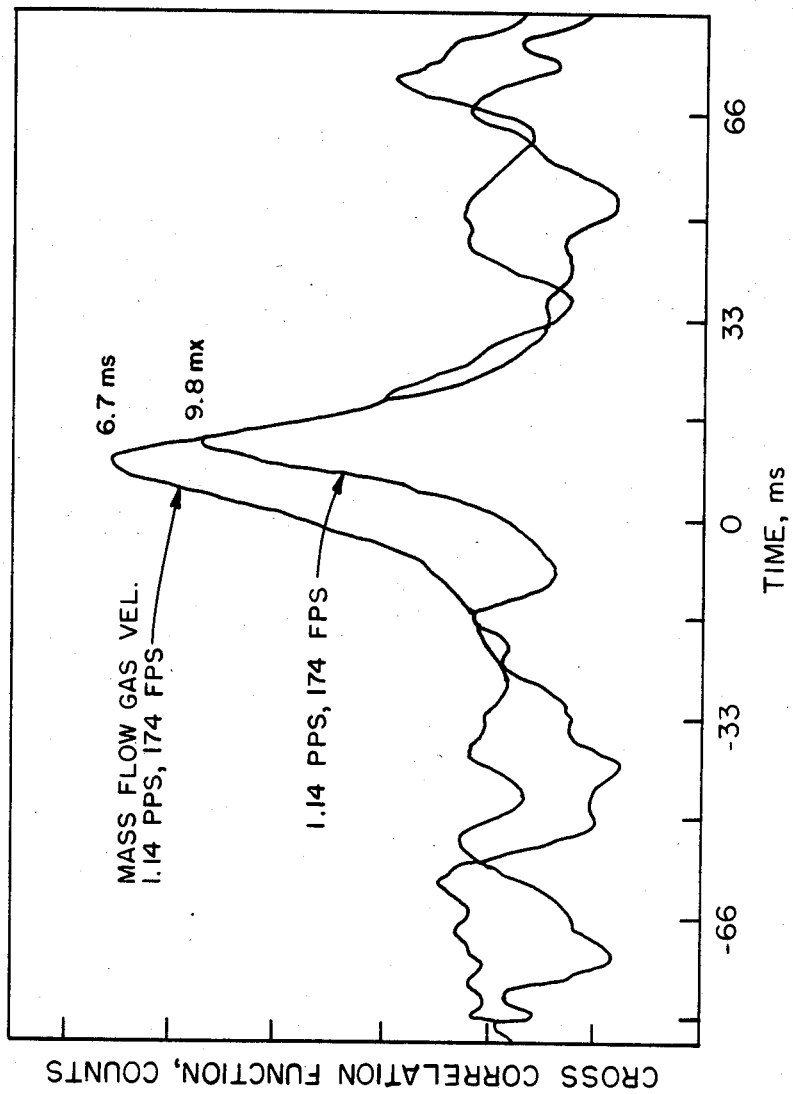
FIG. 2 is a graph of two cross-correlation functions for two limestone air flows using the apparatus of the present invention.

The addition of two more decouplers reduced uncorrelatible noise detected by the sensors from the rest of the loop. Therefore, a better resolved correlation function was observed. FIG. 2 shows two correlation functions for two solid-gas flows under the case 2 arrangement.

Figure 3:
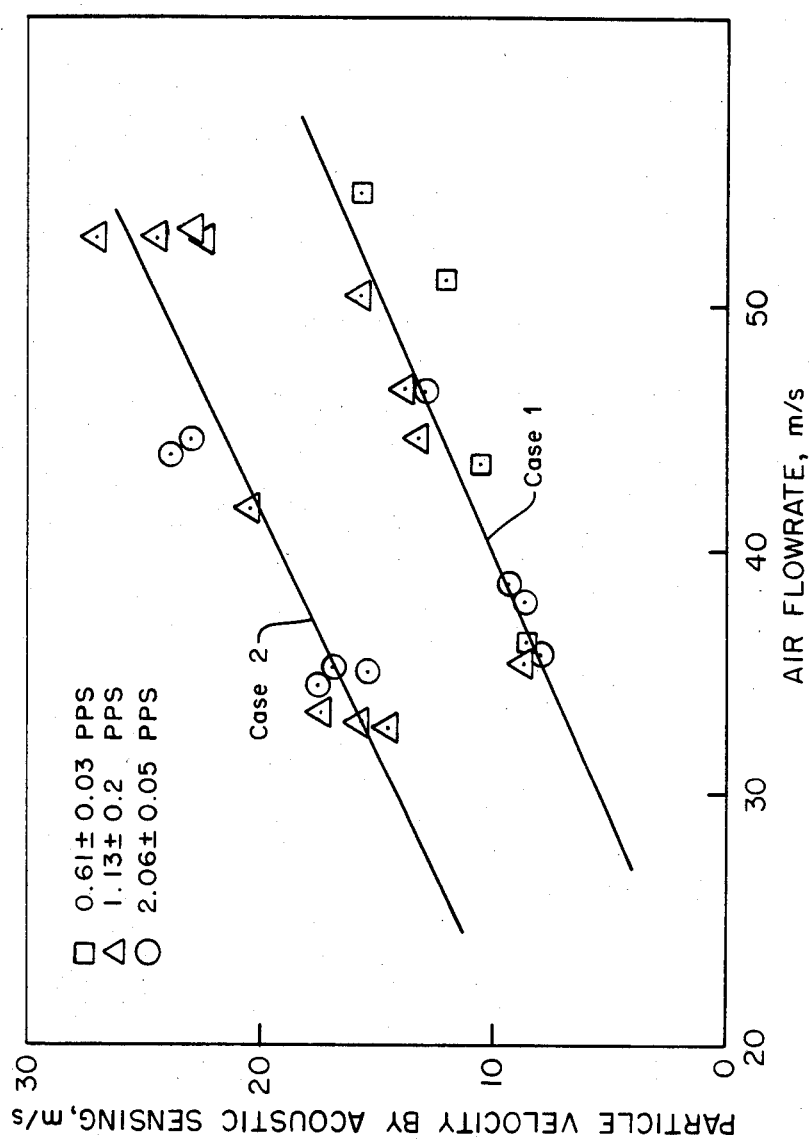
FIG. 3 is a graph of particle velocity vs. air flow rate for two embodiments of the present invention.

FIG. 3 summarizes the results of particle velocity obtained in the two cases of measurement. The particle velocity is ploted against the air flowrate measured prior to the mixing tee. Hence, the air flow rate does not represent the actual local air velocity. Because the solid loading is low, the assumption of a same air velocity along the short test loop may be acceptable. The particle velocity, independent of mass flow, shows a linear relationship with the air velocity. Due to the nozzle gap difference made in the two cases, particle velocities display a signficant difference. Case 1 produces smaller particle velocities than case 2. In terms of slip velocity, we have about 0.24 for case 1 and 0.5 for case 2.

The embodiments of this invention in which an exclusive property or privilege is claimed are defined as follows:

1. Apparatus for measuring particle velocity in a solid-gas flow within a pipe having a wall made of a material capable of propagating an ultrasonic signal therein comprising:

first and second transmitting transducers positioned at first and second locations, respectively, along the pipe, said first and second transmitting transducers being directly connected to the wall of said pipe to develop first and second ultrasonic signals in said pipe wall said first and second ultrasonic signals being modulated by noise from particle impingment;

an acoustic decoupler, positioned between said first and second transmitting transducers, for acoustically isolating said first and second modulated ultrasonic signals from one another;

first and second detecting transducers directly connected to the wall of said pipe for detecting said first and second modulated ultrasonic signals respectively and for generating first and second output signals respectively in response to said first and second detected modulated ultrasonic signals; and means for cross-correlating said first and second output signals.

2. The apparatus of claim 1 wherein said acoustic decoupler comprises a segment of the pipe formed of a sound insulating material.

3. The apparatus of claim 2 wherein said segment comprises a rubber ring.

4. The apparatus of claim 1 further comprising second and third acoustic decouplers positioned such that said first transmitting transducer is between said first and second decouplers and said second transmitting transducer is between said first and third decouplers.

5. The apparatus of claim 4 wherein each of said acoustic decouplers comprises a segment of the pipe formed of a sound insulating material.

6. The apparatus of claim 5 wherein said segment comprises a rubber ring.

7. Apparatus for measuring particle velocity in a solid-gas flow within a pipe having a wall made of material capable of propagating an ultrasonic signal therein, comprising:

an oscillator for generating an input signal;

first and second transmitting transducers coupled to said oscillator and directly connected to the wall of the pipe at first and second locations, respectively, along the pipe, said first and second transmitting transducer acting to develop first and second ultrasonic signals, respectively in the wall of said pipe, said first and second ultrasonic signals being modulated by noise from particle impingment;

an acoustic decoupler for acoustically isolating said first and second modulated ultrasonic signals from one another, positioned between said first and second transmitting transducers;

first and second detecting transducers directly connected to the wall of said pipe for detecting said first and second modulated ultrasonic signals, respectively, and for generating first and second output signals, respectively, in response to said first and second detected modulated ultrasonic signals;

means for mixing said input signal with said first and second outpout signals; and means for cross-correlating said mixed first and second output signals.

8. The apparatus of claim 7 wherein said input signal has an operating frequency in the range of MHZ.

9. The apparatus of claim 7 wherein said acoustic decoupler comprises a segment of the pipe formed of a sound insulating material.

10. The apparatus of claim 7 further comprising second and third acoustic decouplers positioned such that said first transmitting transducer is between said first and second decouplers and said second transmitting transducer is between said first and third decouplers.

11. A method of measuring particle velocity in a solid-gas flow within a pipe having a wall made of a material capable of propagating an ultrasonic signal therein comprising the steps of:

transmitting first and second ultrasonic signals into the wall of the pipe with transducers directly coupled to the pipe wall at first and second locations, respectively, along the pipe, said first and second signals being modulated by noise from particle impingment;

acoustically isolating said first and second modulated ultrasonic signals from one another;

detecting said first and second transmitted modulated ultrasonic signals with transducers directly connected to the pipe wall;

generation first and second output signals in response to said first and second detected modulated ultrasonic signals; and cross-correlating said first and second output signals.

* * * * *